United States Patent
Roberts et al.

(10) Patent No.: US 6,516,120 B2
(45) Date of Patent: Feb. 4, 2003

(54) RIB WAVEGUIDE DEVICE WITH MODE FILTER

(75) Inventors: Stephen William Roberts, Hampshire (GB); Bradley Jonathan Luff, Southampton (GB)

(73) Assignee: Bookham Technology PLC, Oxfordshire (GB)

( * ) Notice: Subject to any disclaimer, the term of this patent is extended or adjusted under 35 U.S.C. 154(b) by 75 days.

(21) Appl. No.: 09/731,843

(22) Filed: Dec. 8, 2000

(65) Prior Publication Data

US 2002/0031304 A1 Mar. 14, 2002

(30) Foreign Application Priority Data

Sep. 13, 2000 (GB) ............................................ 0022486

(51) Int. Cl.[7] .................................................. G02B 6/26
(52) U.S. Cl. .............................. 385/43; 385/14; 385/28; 385/32; 385/50
(58) Field of Search .......................... 385/27.28, 31.32, 385/39, 43, 50, 129, 132, 14

(56) References Cited

U.S. PATENT DOCUMENTS

| | | | | | |
|---|---|---|---|---|---|
| 5,142,596 A | * | 8/1992 | Mizuuchi et al. | ............. | 385/43 |
| 5,724,461 A | * | 3/1998 | Bruno et al. | .................. | 385/11 |
| 6,108,478 A | * | 8/2000 | Harpin et al. | ................ | 385/129 |

FOREIGN PATENT DOCUMENTS

| EP | 0 535 523 A1 | | 4/1993 |
|---|---|---|---|
| JP | 11-248949 | * | 9/1999 |
| JP | 11-258437 | * | 9/1999 |
| JP | 2000-162454 | * | 6/2000 |
| WO | WO 97/11396 | | 3/1997 |

* cited by examiner

Primary Examiner—Rodney Bovernick
Assistant Examiner—Juliana K. Kang
(74) Attorney, Agent, or Firm—Sughrue Mion, PLLC

(57) ABSTRACT

A silicon rib waveguide device includes a mode filter section serially connected to a curved rib section. The curved section has a width large enough to support multimode transmission while the filter section has a straight waveguide of smaller rib width supporting only single mode transmission. A tapered section connects the curved section to the straight section and an outwardly tapered waveguide is connected to the opposite end of the straight section.

11 Claims, 4 Drawing Sheets

RIB WAVEGUIDE DEVICE WITH MODE FILTER

The invention relates to a rib waveguide device with a mode filter section and particularly to a silicon rib waveguide device.

BACKGROUND OF THE INVENTION

Silicon rib waveguide devices may conduct light in single mode or multimode. The dimensions of the rib are important parameters determining the mode of light transmission. The vertical depth of the rib is such that the transmission is normally single moded in the vertical direction and references in this application to variation between single and multimode transmission relate to variations across the width of the rib.

When constructing waveguide devices on a single integrated silicon chip, some optically transmissive paths may be multimode across the transmission path and others may be single moded. Junctions between multimoded and single moded transmission paths may be required. Furthermore, rib waveguides may need to have straight sections or curved sections. Circuit components on the chip may themselves incorporate curved waveguides such as multiplexing and demultiplexing array waveguides and other parts of the chip may require curved waveguides in order to form compact interconnections between components on the chip. The radius of curvature that can be accepted for a curved waveguide will depend on the rib waveguide width as light losses from the waveguide will vary with radius of curvature. It has been found for example that with a 4 $\mu$m wide silicon rib waveguide the minimum radius of curvature without unacceptable losses is 20 mm. However if the waveguide has an increased width to 6 $\mu$m then the radius of curvature may be reduced to 12 mm with approximately the same light loss in passing through the curved section. In order to make compact devices it is desirable to be able to reduce the radius of curvature of curved sections but the use of greater width for the waveguides means using a waveguide width which in a straight section would be multimoded across its width. On passing around a curved waveguide any higher modes above the fundamental would suffer some loss from scattering on passing around the curve but some may remain when the curved waveguide joins a serially connected straight waveguide section.

It is an object of the present invention to provide a mode filter for use in combination with curved and straight silicon rib waveguides so that multimode propagation is filtered out by a narrower straight waveguide rib following a wider curved waveguide rib.

SUMMARY OF THE INVENTION

The invention provides a silicon rib waveguide device including a mode filter section serially connected to a curved rib waveguide section, said curved waveguide section having a first rib width large enough to support multimode transmission, said filter section having a straight waveguide section with a second rib width smaller than said first rib width and supporting only single mode transmission, said filter section having a first taper section connecting the curved waveguide section to the straight waveguide section and tapering in towards one end of said straight section, and a second taper section connected to an opposite end of the straight section and tapering outwardly from the straight section for connection to an optical transmission device having an optical path width greater than said second rib width.

The waveguide device may include a plurality of curved rib waveguides formed on a common silicon planar device, each connected to a similar respective mode filter section.

The first rib width may be at least 50% greater than said second rib width.

The straight section may have a length between the taper regions of at least 200 times the said second rib width.

The length of each taper section may be at least 80 times the said second rib width.

The second rib width may be approximately 4 $\mu$m and the first rib width approximately 6 $\mu$m.

The radius of curvature of the curved section may be less than 20 mm.

The radius of curvature of the curved section may be approximately 12 mm.

Said second taper section may be connected to a multimode interference (MMI) device.

The mode filter section may be optically connected with a multiplexer or demultiplexer device using a curved array of waveguides.

The waveguide device is preferably formed as an integrated silicon chip device.

DESCRIPTION OF THE PREFERRED EMBODIMENTS

Figure 1:
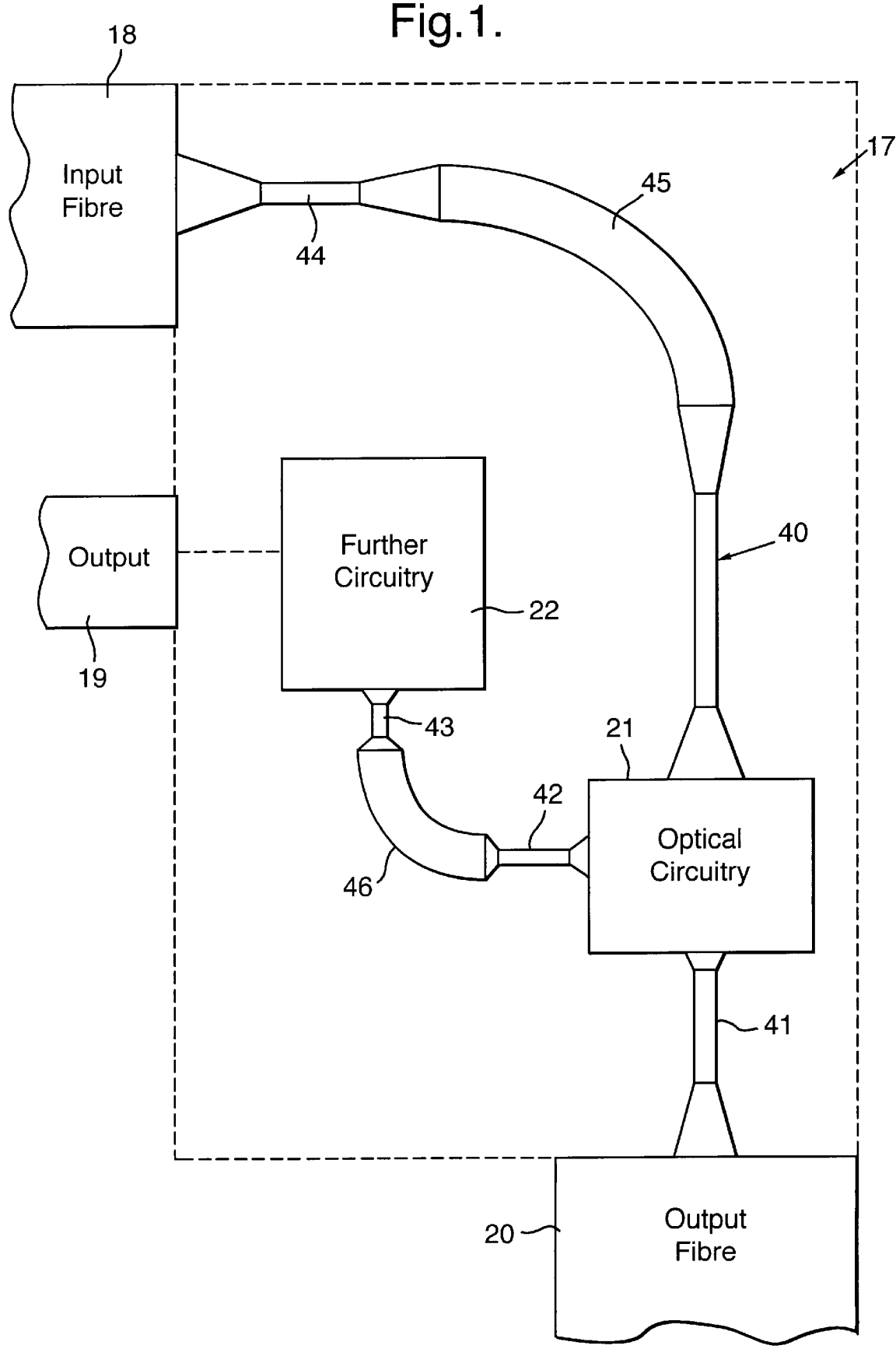
FIG. 1 is a schematic view of an integrated silicon waveguide chip in accordance with the present invention.
Figure 2:
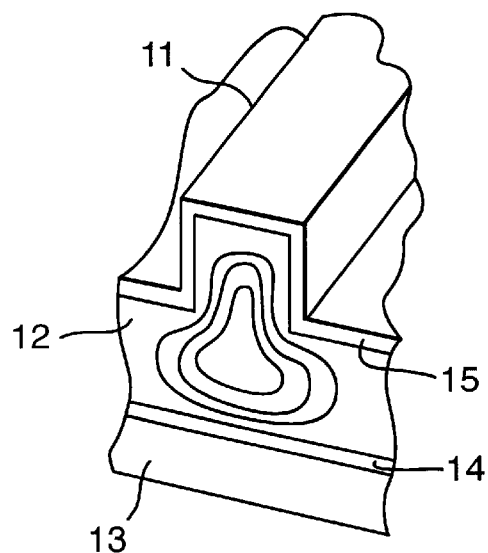
FIG. 2 shows a prior art construction of the type of silicon rib waveguide used on the chip of FIG. 1.
Figure 6:
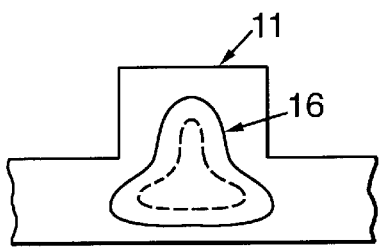
FIG. 6 shows a transmission mode in the prior art device shown in FIG. 2.

FIG. 1 illustrates schematically an integrated silicon chip forming a waveguide device using silicon on insulator rib waveguides of the type illustrated in FIG. 2. Such waveguides are of a known type of ridge waveguide formed from silicon insulator. An upstanding rib 11 is formed on a silicon layer 12. A silicon substrate 13 is covered with a silicon dioxide layer 14 immediately below the silicon layer 12. A silicon dioxide coating 15 is formed over the upper surface of the silicon 12 and over the rib 11. Optical signals are transmitted in a single mode through the silicon layer and each rib 30 as shown in FIG. 6. The mode pattern is illustrated at 16 and is in this example single moded in the vertical and horizontal directions.

Figure 4:
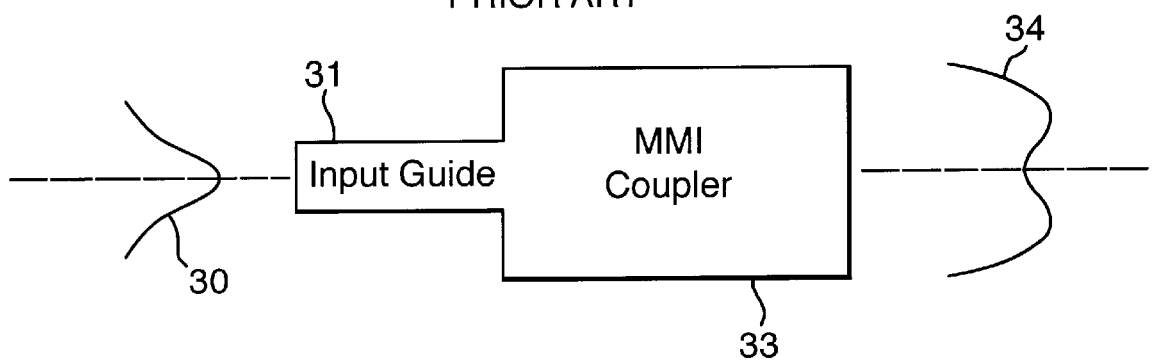
FIG. 4 illustrates a prior art use of a multimode interference (MMI) device which may be used on the chip of FIG. 1.
Figure 3:
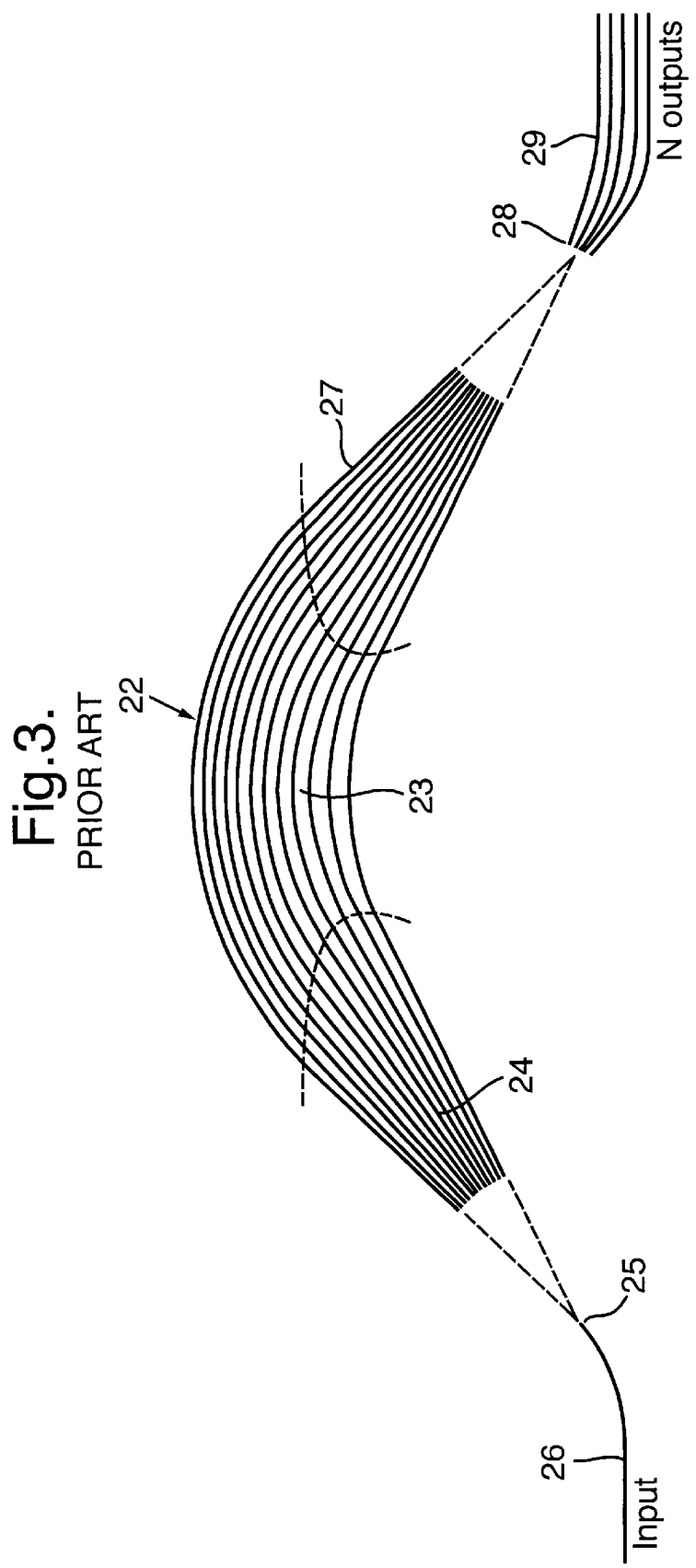
FIG. 3 illustrates a prior art multiplexer and/or demultiplexer using an array of waveguides which may be incorporated on the chip of FIG. 1.

In FIG. 1 the integrated silicon chip is indicated at 17 and has connected at its boundaries one or more input optical fibres 18 and a plurality of optical fibre outputs 19 and 20. On the chip are integrally formed a plurality of optical circuitry components 21 and 22 which may be in the form of prior art optical components such as are shown in FIGS. 3 and 4. In multiplexing and demultiplexing optical circuitry it may be desirable to use an array of curved waveguide paths arranged in parallel with each other as shown in the prior art arrangement of FIG. 3. Such an array waveguide device 22 consists of a plurality of curved rib waveguides 23 arranged side by side with straight input ends focussed at one end 25 of an input waveguide 26. The array has a plurality of straight output waveguides 27 focussed at 28 at one end of a plurality of output waveguides 29. The optical circuitry 21 and 22 in FIG. 1 may include an array of the type that is shown in FIG. 3.

A multimode interference device (MMI) of the type shown in FIG. 4 and already known in the art may be included on the chip as part of the circuitry 21 or 22 in FIG. 1. As shown in FIG. 4, light which is being conducted on chip may have a field distribution of the type shown at 30 in FIG. 4 and pass through an input guide 31 to an MMI coupler 33 such that the output field of the MMI coupler has the double peaked field distribution shown at 34. Such MMI couplers may be of use in providing input light to the input end of an array such as that shown in FIG. 3. The input to the MMI coupler should be single mode and symmetrical with respect to the body of silicon forming the coupler.

In the arrangement of FIG. 1 various circuitry of the type shown in FIGS. 3 and 4 together with a plurality of straight and curved rib waveguide sections may be formed to provide the most compact arrangement of circuitry on a single integrated silicon chip. In the example of FIG. 1 a plurality of waveguide mode filter sections are provided as indicated at 40, 41, 42, 43 and 44. Each of these consists of a straight narrow rib waveguide located between tapered sections at opposite ends flared outwardly from the narrow straight waveguide section and connected to adjacent optical paths of greater transverse width than the narrow rib waveguide and incorporating one or more curved rib waveguide sections as indicated at 45 and 46.

In this example the curved rib waveguide 45 and mode filter 40 will be described with more detail with reference to FIGS. 1 and 5.

In this particular example the straight narrow rib waveguides have a narrow rib width such as 4 $\mu$m which supports only single mode transmission across its width. When forming a curved waveguide on such a silicon chip, losses occur in transmission around a curved section and the losses increase with smaller radius of curvature. For a 4 $\mu$m rib width the radius should not less than 20 mm. In order to produce a compact arrangement, it may be desirable to increase the rib width to 6 $\mu$m around the curve thereby enabling the radius to be reduced to 12 mm with approximately the same light loss as 20 mm radius for a 4 $\mu$m rib width. However, for a silicon rib width of 6 $\mu$m it is possible for multimode propagation to occur across the width of the rib in a straight waveguide section. Consequently the present embodiment includes a mode filter 40 following the curved waveguide section 45. The structure of this is shown more clearly in FIG. 5. The curved section 45 has in this example a rib width W1 of 6 $\mu$m and this is joined by an inwardly tapered section 50 to the narrow straight rib waveguide 51 of uniform width along its length. The straight region 51 is then connected by an outwardly flared tapered region 52 into the optical circuitry 21 which in this example is a planar slab of silicon forming an MMI coupler of the type shown at 33 in FIG. 4. It will be understood that in FIG. 5 the curved rib 45, straight rib 51 and the planar slab 21 are all formed on a silicon substrate 53 as to form upstanding regions from that planar substrate. In the particular example shown, the transverse width W2 of the straight waveguide 51 is 4 $\mu$m. The length of the straight waveguide section 51 is shown at L1 and this example is 1000 $\mu$m, that is at least 200 times the width W2 of the straight rib section. The radius of curvature of the curved section 45 is less than 20 mm and in this example is approximately 12 mm. The length L2 of the tapered section 50 is in this example 340 $\mu$m which is at least 80 times the width W2 of the straight waveguide section. The length of the tapered section 52 is in this preferred example the same as the length of the tapered section 50.

It will however be understood that other dimensions may be used. The angle of taper of the outer walls of the tapered sections 50 and 52 in relation to the axis of the straight rib waveguide 51 may for example be 0.17°.

Figure 5:
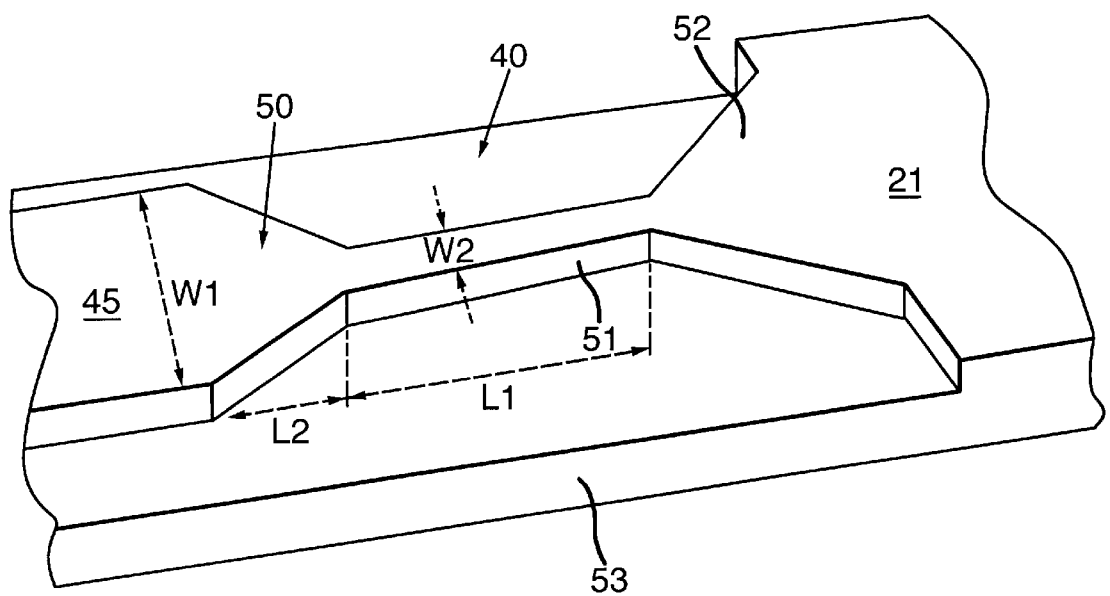
FIG. 5 is a perspective view of a mode filter which is incorporated in the device of FIG. 1.
Figure 7:
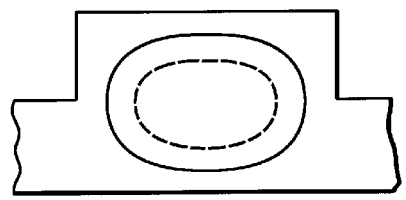
FIG. 7 illustrates a modified transmission mode in the output of a mode filter of the type shown in FIG. 5.

In use of the device shown in FIGS. 1 and 5, light which is input from the input fibre 18 may include multimodes across the fibre and these will enter the chip waveguides and pass through the filter section 44 which will transmit only a single fundamental mode. Light which passes into the wider curved waveguide section 45 may include multimode transmission with some scattering on passing around the curved waveguide 45. Any modes other than the fundamental which are output by the wider waveguide 45 will be filtered by the mode filter 40 such that only the single fundamental mode across the width of the waveguide is transmitted into the optical circuitry 21. In the case of coupling the filter 40 to an MMI coupler providing the circuitry 21 of FIGS. 1 and 5, the symmetry of that single mode will be improved by the outwardly tapered section 52. The normal single mode pattern shown in FIG. 6 is modified by the widening tapered section 52 so as to change into a pattern substantially as shown in FIG. 7 thereby giving greater symmetry both transversely and vertically on passing through the multimode interference device 21. Such field patterns may be multimoded in depth as well as transversely on forming the output of the MMI device 21.

It will be understood that the device of FIG. 1 may incorporate a variety of optical components interconnected by curved and straight rib waveguide sections. The width of the curved sections may be increased to allow the compact formation obtainable by using wider waveguide sections and the mode control may be effected by incorporating mode filter sections having straight rib waveguides with end tapered sections as described above.

The invention is not limited to the details of the foregoing example.

What is claimed is:

1. A silicon rib waveguide device including a mode filter section serially connected to a curved rib waveguide section, said curved waveguide section having a first rib width large enough to support multimode transmission, said filter section having a straight waveguide section with a second rib width smaller than said first rib width and supporting only single mode transmission, said filter section having a first taper section connecting the curved waveguide section to the straight waveguide section and tapering in towards one end of said straight section, and a second taper section connected to an opposite end of the straight section and tapering outwardly from the straight section for connection to an optical transmission device having an optical path width greater than said second rib width.

2. A waveguide device according to claim 1 in which said curved waveguide section is one of a plurality of curved rib waveguide sections formed on a common silicon planar device each waveguide section connected to a respective mode filter section.

3. A waveguide device according to claim 1 in which the first rib width is at least 50% greater than said second rib width.

4. A waveguide device according to claim 1 in which the straight section has a length between the taper regions of at least 200 times the said second rib width.

5. A waveguide device according to claim 4 in which the length of each taper section is at least 80 times the said second rib width.

6. A waveguide device according to claim 1 in which the second rib width is approximately 4 μm and the first rib width is approximately 6 μm.

7. A waveguide device according to claim 1 in which the radius of curvature of the curved section is less than 20 mm.

8. A waveguide device according to claim 7 in which the radius of curvature of the curved section is approximately 12 mm.

9. A waveguide device according to claim 1 in which said second taper section is connected to a multimode interference (MMI) device.

10. A waveguide device according to claim 1 in which the mode filter section is optically connected with a multiplexer or demultiplexer device using a curved array of waveguides.

11. A waveguide device according to claim 1 formed as an integrated silicon chip device.

* * * * *